US012718609B1

(12) United States Patent
Jiang et al.

(10) Patent No.: US 12,718,609 B1
(45) Date of Patent: Aug. 25, 2026

(54) ENHANCED MULTILINGUAL VIDEO ON-SCREEN TEXT EXTRACTION

(71) Applicant: Amazon Technologies, Inc., Seattle, WA (US)

(72) Inventors: Yundi Jiang, New York, NY (US); Trung Kien Nguyen, Seattle, WA (US); Changhyeok Lee, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 18/653,625

(22) Filed: May 2, 2024

(51) Int. Cl.
*G06V 10/764* (2022.01)
*G06V 10/25* (2022.01)
(Continued)

(52) U.S. Cl.
CPC ........ *G06V 30/19093* (2022.01); *G06V 10/25* (2022.01); *G06V 10/764* (2022.01); *H04N 21/4316* (2013.01)

(58) Field of Classification Search
CPC ............. G06V 30/19093; G06V 10/25; G06V 10/764; H04N 21/4316
See application file for complete search history.

(56) References Cited

U.S. PATENT DOCUMENTS

2011/0123115 A1* 5/2011 Lee ...................... G06V 30/142 382/229
2015/0319510 A1* 11/2015 Ould Dellahy, VIII .................... H04N 21/4725 725/32
(Continued)

FOREIGN PATENT DOCUMENTS

CN 112101344 A * 12/2020 ............. G06N 3/045
CN 113392689 A * 9/2021 ............. G06N 3/045
(Continued)

OTHER PUBLICATIONS

Lin T. Y. et al., 'Feature pyramid networks for object detection', 9 pages, CVPR 2017.
(Continued)

*Primary Examiner* — Henok Shiferaw
*Assistant Examiner* — Woo C Rhim
(74) *Attorney, Agent, or Firm* — Eversheds Sutherland (US) LLP

(57) ABSTRACT

Devices, systems, and methods for multilingual video on-screen text extraction may include a method including extracting, by a language-independent machine learning model, bounding boxes around first text groups in a sampled subset of video frames; outputting, by the machine learning model, pixel coordinates of the bounding boxes and predicted classifications of the first text groups; receiving detected non-item overlay texts in the sampled subset of video frames; identifying, based on the received detected non-item overlay texts, second text groups in the sampled subset of video frames; identifying, for the second text groups, a respective start time in which a respective text of the second text groups first appears and a respective end time in which a respective text of the second text groups disappears; and reducing the second text groups to third text groups based on the respective start times and the respective end times.

20 Claims, 6 Drawing Sheets

(51) Int. Cl.
*G06V 30/19* (2022.01)
*H04N 21/431* (2011.01)

(56) References Cited

U.S. PATENT DOCUMENTS

| | | | | |
|---|---|---|---|---|
| 2022/0189174 | A1* | 6/2022 | Chao | G06V 20/48 |
| 2024/0111968 | A1* | 4/2024 | Umapathy | G06V 30/10 |
| 2025/0131035 | A1* | 4/2025 | Hoffman | G06V 20/41 |
| 2025/0272470 | A1* | 8/2025 | Sathianathan | G06F 40/103 |
| 2025/0391190 | A1* | 12/2025 | Strugo | G06V 20/62 |

FOREIGN PATENT DOCUMENTS

| | | | | | |
|---|---|---|---|---|---|
| CN | 113869304 | A | * | 12/2021 | G06F 18/241 |
| CN | 114332902 | A | * | 4/2022 | |
| CN | 115565109 | A | * | 1/2023 | G06V 20/46 |
| CN | 115909176 | A | * | 4/2023 | |
| EP | 4242988 | A1 | * | 9/2023 | G06V 30/147 |
| KR | 20230086368 | A | * | 6/2023 | G06V 30/153 |
| KR | 20230119370 | A | * | 8/2023 | G06V 20/63 |

OTHER PUBLICATIONS

Zhang, Y. et al., ByteTrack: Multi-Object Tracking by Associating Every Detection Box, 14 pages, ECCV, 2022.

Wang, X. et al., 'End-to-End Scene Text Recognition in Videos Based on Multi Frame Tracking', 2017 14th IAPR International Conference on Document Analysis and Recognition (ICDAR), pp. 1255-1260, Kyoto, Japan, 2017.

Gracia, C.M. et al., 'Real-time text tracking in natural scenes', IET Computer Vision, vol. 8, No. 6, pp. 670-681, 2014.

Wu, W., Zhang et al., 'A bilingual, openworld video text dataset and end-to-end video text spotter with transformer', In Thirty-fifth Conference on Neural Information Processing Systems Datasets and Benchmarks Track (Round 2), 20 pages, 2021.

Zeng, F. et al., 'MOTR: End-to-End Multiple-Object Tracking with Transformer', European Conference on Computer Vision (ECCV), 17 pages, 2022.

Cheng, Z. et al., 'You only recognize once: Towards fast video text spotting', In ACM MM, pp. 855-863, 2019.

Wu, W. et al., End-to-End Video Text Spotting with Transformer, 12 pages, Arxiv, 2022.

* cited by examiner

602 HARDWARE PROCESSOR
624 INSTRUCTIONS
604 MAIN MEMORY
624 INSTRUCTIONS
606 STATIC MEMORY
624 INSTRUCTIONS
628 SENSORS
620 NETWORK INTERFACE
630 ANTENNA(S)
GRAPHICS DISPLAY DEVICE 610
INPUT DEVICE 612
UI NAVIGATION DEVICE 614
STORAGE DEVICE 616
MACHINE-READABLE MEDIUM 622
INSTRUCTIONS 624
SIGNAL GENERATION DEVICE 618
VIDEO TEXT EXTRACTION MODULES 619
POWER DEVICE 632
608
OUTPUT CONTROLLER 634
626 COMMUNICATIONS NETWORK

ENHANCED MULTILINGUAL VIDEO ON-SCREEN TEXT EXTRACTION

BACKGROUND

Videos may include text that may be difficult to identify and track across video frames. Automatically translating text in video frames from one language to another can therefore be challenging. Machine learning models for text identification and extraction from video may benefit from enhanced techniques.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
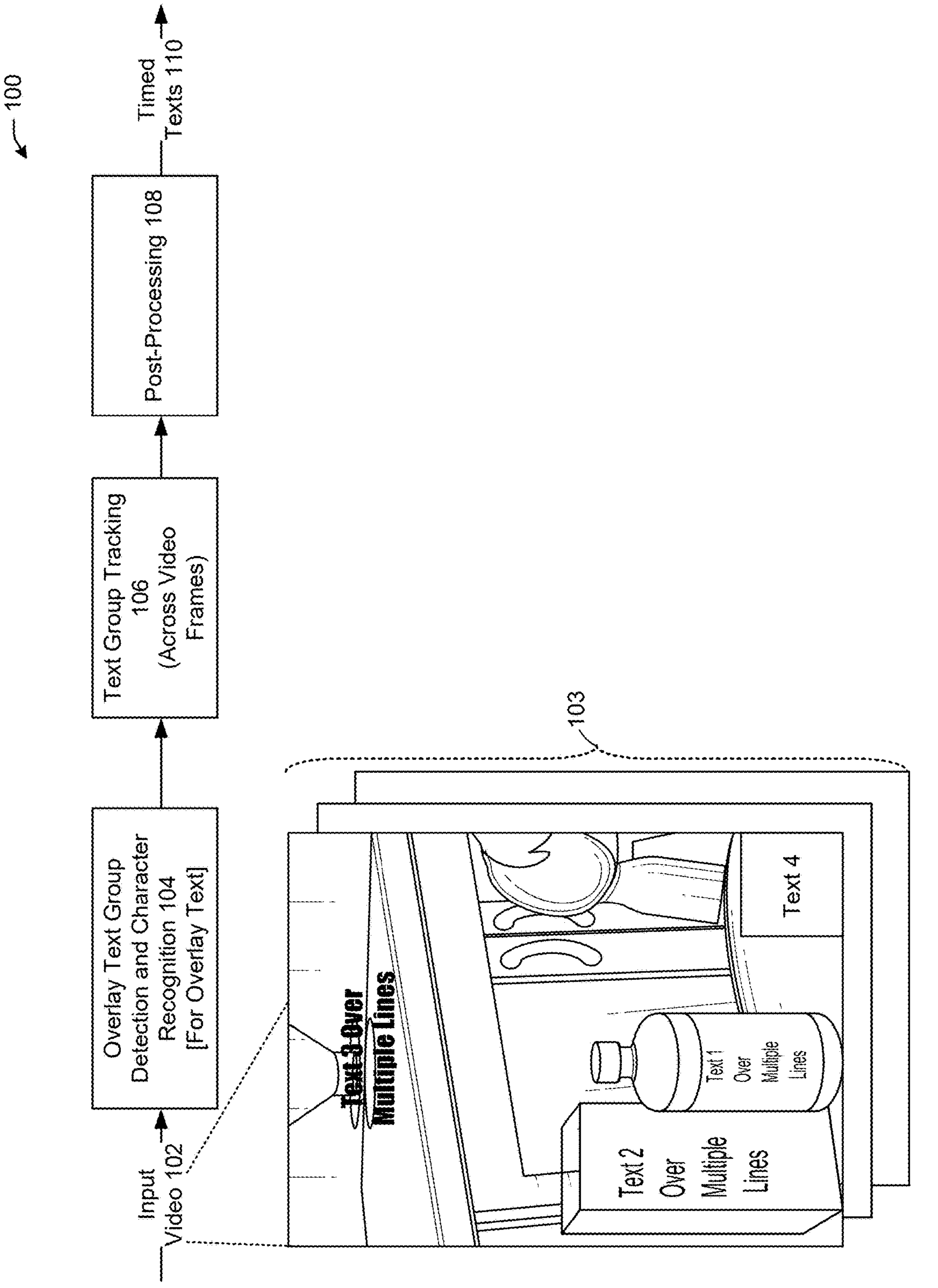
FIG. 1 illustrates an example process for enhanced multilingual video on-screen text extraction in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhanced multilingual video on-screen text extraction.

Video content (e.g., video frames) may include different types of text, including overlay text. Human translation of a large corpus of video frame text from one language to another can require many human operators, and significant time and money. To reduce the labor resources of human video text translation, automated processes may be used.

However, automated translating of video frame text from one language to another can be challenging because the overlay text may be difficult to identify and extract from video frames. For video translation, it is important to accurately detect the texts at paragraph level because translation is less accurate at a word-by-word level than when translating the full context at sentence/paragraph level (e.g., with multiple lines of text).

However, existing video text detection techniques are operated at word or line level, lacking the context-preserving feature for precise understanding or translation. Furthermore, obtaining the timestamps at which the texts appear in and disappear from video frames is important for embedding the translated texts back into the videos, and this process is known as text tracking.

Currently, there is no object tracking technique for on-screen text group entities across multiple video frames. In addition, existing video text detection techniques do not distinguish between scene texts (e.g., texts appearing in an image captured by a camera) versus text overlay (e.g., text added to an image). Such distinction is necessary for video translation, however.

Existing automated techniques to identify and track objects in video frames may predict a future state (e.g. position and motion) of an object iteratively, which works well for physical objects because of physical laws and system dynamics that govern their movement from frame to frame (e.g., a consistent velocity of an object). However, because the objects of interest in video frames herein are texts overlaid on the video frames, those rules for physical objects and people do not apply. Text overlaid on the video frames may be animated with a more diverse range of effects, such as fade-in/fade-out, fly-in/fly-out, roll-in/roll-out, zoom-in/zoom-out, flip-in/flip-out, expanding/shrinking, and the like, which do not apply to frame-to-frame position/motion of objects and people. Defining a state variable that can distinctively capture the text groups for tracking purposes is challenging, and obtaining a system dynamics model is difficult since there are many possible transition and movement types for text groups to be rendered in videos.

In addition, existing automated video text identification and translation may be language-dependent. In particular, the language of the video overlay text may need to be specified, either in metadata of the video or by an input or prompt that tells a computer or model what the overlay text language is so that the overlay text can be modified.

Thus, automated translation of video text faces challenges that human translation does not, and the enhanced techniques herein address the computer-based challenges described herein.

The present disclosure provides techniques that identify video frame text, distinguish between different types of video frame text for the purpose of identifying text to translate and not translate, track the video frame text across multiple video frames, extracts the text to translate from the video frames, and inserts the translated text back into the video frames.

In one or more embodiments, for a given set of video frames, one or more modules may perform an overlay text group detection in the video frames (e.g., ignoring scene texts), and may perform a character recognition of the detected overlay text (e.g., optical character recognition or another technique). Given an input video, the one or more modules may sample one frame per every n (e.g., where n>1) frames in the video. On each frame, the modules may use a semantic segmentation model with FPN (feature pyramid network) architecture and an encoder (e.g., EfficientNet or another convolutional neural network architecture) to classify each pixel (including pixels or voxels herein) in the image (e.g., video frame) into three classes—item-identifying overlay text, non-item-identifying overlay text, and background. For example, item-identifying text may include text of a name of an item or business entity, whereas non-item overlay text may include description text, ingredients of items shown in the frames, benefits of items shown in the frames, or the like. With the pixel-wise segmentation, the modules may then extract bounding boxes around each detected and located text object. For each detected text box, the modules may enhance the detection results with Optical Character Recognition (OCR) results so the text content in each detected box is recognized. The text detection may be conducted at text group level, rather than word level, and a text group is defined a self-contained text piece (e.g., either a sentence or a paragraph) to be translated as one entity.

In one or more embodiments, the overlay text group detection model may be language-independent. The model may be trained using training data in multiple languages so that the model may detect overlay text regardless of the language of the text, and without any metadata, prompting, or other input data defining the language of the overlay text in the analyzed video frames. Even in the inferencing, the model does not need to identify the overlay text language when detecting and classifying the overlay text.

In one or more embodiments, once text groups are detected and recognized, one or more text tracking modules may track the detected text groups across different video frames to extract their timestamp of appearance and disappearance. To achieve this, the one or more text tracking modules may follow a tracking-by-detection paradigm that associates the detected text groups between consecutive frames (e.g., identifying a best match for overlay text on frame t by examining overlay text on frame t−1, and if no match exists on frame t−1, looking for a match at frame t−2, and so on, until either a match is found or a threshold number of frames, such as t−5, is reached). Existing object tracking systems either rely on physics-based probability models or image similarity models to draw association across frames. In contrast, through experiment it was found that the existing solutions all fail to track text overlay objects because the objects are added animation effects that are not based on physical motion, and the text groups encompass more intricate features than most image similarity models can capture. The enhanced solution herein to this tracking problem is to use a composite similarity score computed from a linear combination of a text similarity score and a location similarity score. This new tracking paradigm performs much better than the conventional tracking approaches.

In one or more embodiments, after the text tracking, one or more post-processing modules may be used. Because videos tend do have rich and diverse visual effects/animation for their text overlay, detection, OCR, and tracking can be challenging due to the motion and transition of the texts across multiple frames. For detection, false negative errors can occur when texts are partially occluded, causing broken text tracks. OCR can also generate noisy recognized texts during transitional frames. Because the tracking step associates detections using text similarity score, the OCR noise could also result in broken text tracks. The post-processing step aims to alleviate the tracking and recognition errors. The post-processing modules may use an image similarity score generated with a machine learning model trained to distinguish different text images, along with location similarity and text similarity to resolve noisy transition track issues. The post-processing modules also may use detection confidence and may track stability information to further filter out extremely unstable tracks.

In one or more embodiments, the enhanced techniques herein may evaluate the final model output by leveraging ground-truth data collected (e.g., a one-time effort) from human operators. This automated evaluation framework eliminates the necessity of relying on human evaluation process as existing techniques do. With this enhanced evaluation framework, the model development and iteration is fast, efficient, and consistent.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for enhanced multilingual video on-screen text extraction in accordance with one or more embodiments of the present disclosure.

Referring to FIG. 1, the process 100 may include input video 102 (e.g., including multiple video frames 103) to an overlay text group detection and character recognition 104, where overlay text may be identified and classified. Once the text has been identified and classified, text group tracking 106 may track the identified text across the video frames 103 to identify when identified text groups appear in and disappear from the video frames 103 (e.g., a text group may appear in a subset of one or more of the video frames 103, but not necessarily all of the video frames 103). Based on the text group tracking 106 and start/end timestamps of the text groups, post-processing 108 may alleviate text identification and tracking errors that may occur at the previous steps, and ensure that timed texts 110 (e.g., texts with start/end timestamps in the video frames 103) are accurate for translation from one language to another language and for re-insertion back into the video frames 103 after language translation.

In one or more embodiments, given the input video 102, text detection by the modules of the text group detection and character recognition 104 may be performed by a tunable sampling rate (e.g., one of every n of the video frames 103). To detect text groups in a sampled video frame (e.g., image), the text group detection and character recognition 104 may use semantic segmentation (e.g., FPN architecture and an encoder such as EfficientNet or another convolutional neural network architecture) to classify each pixel in the frame into three classes: (1) item overlay text, (2) non-item overlay text, and (3) background pixels without knowing or determining the language of the overlay text. The text group detection and character recognition 104 may distinguish between scene text and overlay text, ignoring scene text as text not to be modified. As shown in FIG. 1, the video frames 103 may include pixels representing "Text 1 Over Multiple Lines" and "Text 2 Over Multiple Lines" as scene texts, pixels representing "Text 3 Over Multiple Lines" as non-item overlay text, pixels representing "Text 4" as item overlay text (e.g., text of a name of an item or entity added to the video frame), and background pixels. The segmentation machine learning architecture may be based on multi-scale features extracted from the video frames 103 at different resolutions, and may include an encoder (e.g., EfficientNet, etc.) including convolutional layers with compound scaling in depth, width, and resolution. In contrast with existing text detection techniques where text is detected at a word level or line level, the enhanced text detection herein detects groups of text, where a text group is a cluster of words with self-contained meaning. Text detection at a group level may be facilitated by words in a text group being physically close to each other and being visually similar (e.g., font and size). The detection results may include bounding box coordinates, a confidence score (e.g., an average of the pixel-level prediction values within the bounding box), and a predicted class of the text group.

In one or more embodiments, after the text detection, the text group detection and character recognition 104 may perform OCR (or other character recognition) to recognize texts inside the detected bounding boxes in the video frames 103. This text recognition step enriches the text detection output with recognized texts, which is important for tracking the text groups accurately across multiple of the video frames 103. The text recognition may support multiple languages to be able to recognize corresponding characters and words in any language. In this manner, the text group detection and character recognition 104 may not be provided with the actual text language of any of the video frames 103, and may detect the text without being provided the text language. Following the text recognition step, each detected text group may include a text content attribute in addition to any attributes identified at the text detection step. In this manner, the outputs from the text group detection and character recognition 104 may include recognized text groups and their attributes, including a text content attribute.

In one or more embodiments, the character recognition 104 may call only the frames where there are detected overlay texts, as opposed to calling all frames. The text detection therefore may be performed on all sampled frames. The OCR may be applied on the frames in which the overlay texts are detected. By calling the subset of the video frames 103 in which overlay texts are detected, the number of calls (e.g., application programming interface calls) may be reduced, leading to a faster and less computationally expensive process, especially when only a small subset of the video frames 103 includes overlay text.

In one or more embodiments, after the text group detection and character recognition 104, modules of the text group tracking 106 may track the detected text groups across different video frames (e.g., of the video frames 103) to extract their timestamp of appearance and disappearance. The text group tracking 106 may follow a tracking-by-detection paradigm in which the detected text groups may be associated between consecutive video frames. For example, the text group tracking 106 may identify a best matching overlay text for an overlay text in frame t by working backward and evaluating overlay text in frame t−1. When a best match is found in frame t−1, then a best match for the overlay text in frame t−1 may be identified by working backward to frame t−2, and so on. When no matching overlay text is identified in a preceding frame, the text group tracking 106 may continue to look backward (e.g., to frame t−2, frame t−3, and so on) until a match is found or until a threshold number of frames are evaluated without identifying a match.

Whereas existing word tracking systems use a different combination of image similarity, text similarity, and location similarity to draw association across frames, the enhanced text tracking herein recognizes that text groups include more intricate features than existing image similarity models are able to capture. Image embeddings obtained from metric learning tend to learn the overall artistic/font style of the group image instead of the specific characters and their arrangement within the image patch. Overlay texts in the input video 102 tend to use a consistent font style, so using an image similarity score to make association decisions may lead to a significant number of over-merging cases where text groups on individual frames that belong to different tracks end up being tracked as one text track. This error is difficult to rectify with post-processing. To solve this problem, the text group tracking 106 may use a composite similarity score determined from a linear combination of a text similarity score and a location similarity score.

In one or more embodiments, the text group tracking 106 may determine text similarity for normalized texts in each detected text group. The normalizing step may include: (1) lower-casing all the words, (2) removing symbols, (3) removing punctuation, and (4) removing multiple white spaces and leading and trailing white spaces. The text similarity score $S_{text}$ between the j-th detection on frame l, $D_{l,j}$, and the i-th detection on frame k, $D_{k,i}$ may be represented by:

$$S_{text} = (D_{l,j}, D_{k,i}) = \max\left(\mathbb{1}_{c_{k,i} \subseteq c_{l,j} | c_{l,j} \subseteq c_{k,i}} \alpha_1, \mathbb{1}_{CER(c_{k,i}, t_{i,j}) < 0.1} \alpha_2\right),$$

where $t_{k,i}$ denotes the normalized text for detection $D_{k,i}$, $t_{l,j}$ denotes the normalized text for detection $D_{l,j}$, CER( ) denotes character error rate between two strings defined by the sum of substitution, deletion, and insertion errors divided by a number of characters in the reference string, and $\alpha_1$ and $\alpha_2$ are hyper-parameters set at 1 and 0.9, for example.

In one more embodiments, the location similarity score determined by the text group tracking 106 may be based on an intersection over minimum (IoM), which test results have found is an improvement over intersection over union (IoU) due to the prevalent transitional frames where a text track is partially shown in the video frames 103. For two consecutively sampled frames (e.g., not necessarily two actual consecutive frames in the video frames 103) where a text track is partially visible in one sampled frame and fully visible in the next sampled frame, the two detections may have a low IoU score, but a high IoM score.

In one more embodiments, using IoM for the scoring helps associate the text tracks in transition and produces fewer broken text tracks. The location similarity score $S_{loc}$ of the text may be defined as:

$$S_{loc}(D_{l,j}, D_{k,i}) = IoM(D_{l,j}, D_{k,i}) = \frac{(\text{Area}(\text{box}_{l,j} \cap \text{box}_{k,i})}{\min(\text{Area}(\text{box}_{l,j})\text{Area}(\text{box}_{k,i}))}.$$

The pairwise matching cost between two detections $L_{match}(D_{l,j}, D_{k,i}) = 1 - w_1 S_{text} - w_2 S_{loc}$, where $w_1$ and $w_2$ are hyper-parameters set to 0.6 and 0.4, for example. An algorithm using the matching cost may associate pairwise detections with a cost limit (e.g., 0.2). Text tracks may be constructed sequentially by pairwise matching the detections on each sampled video frame. However, sequentially processing each video frame to extend a text track may be impacted by false negative detection errors, especially when occlusion or transition causes the texts to be partially or barely visible on certain frames. The broken track problem may be alleviated by including a lost track margin. When there is a frame in which a text detection cannot be matched with an active text track, instead of immediately stopping the extension of the active text track, the text group tracking 106 may keep the track active for a few more additional frames, and may reactivate the track when a detection is found within the subsequent frames. The text group tracking 106 may stop extending a track when an object is lost in a number of frames, where the number of frames may be a hyper-parameter (e.g., lost margin).

In one or more embodiments, a similarity score may be a combination of text similarity score and location similarity score. The text similarity score may measure text similarity of normalized text, using word-level/character-level edit distances or error rates, however, the following heuristic may be used: (a) if two groups have identical text content or one is a subset of another, a score of 1 may be assigned; (b) if two groups have a character error rate of <0.1, a score of 0.9 may be assigned; otherwise (c) assign a text similarity score of 0. The location similarity score may represent an intersection over a smaller text box area. A float may indicate a ratio between intersection of two bounding boxes and a minimum area of the two bounding boxes.

In one or more embodiments, the input video 102 may include diverse visual effects and animations in text overlays, posing challenges for text detection, tracking, and recognition. Occlusion and transitional effects may result in false negative detection and OCR errors, which further result in broken text tracks. Refinement of the tracking output based on image similarity, time similarity, and location similarity may alleviate the tracking and recognition errors. An image similarity score may be from 0-1 generated with a metric learning framework trained to distinguish different text group images. Location similarity for any two text tracks may be based on the $S_{loc}(D_{l,j}, D_{k,i})$ equation above in which the bounding boxes are the merged bounding boxes of individual detections in the entire text trajectory. Time similarity may be determined based on either absolute time difference or relative time overlap between two text tracks. Noisy and unstable text tracks with high variation in a bounding box and text content may be filtered out. The classification for a text track may be based on aggregated frame-wise classification results.

The enhancements of the process 100 herein provide technical improvements over using a Kalman filter or particle filter, for example. Such existing filtering techniques predict a future state (e.g. position and motion) of an object iteratively, which works well for physical objects because of physical laws and system dynamics that govern their movement from frame to frame (e.g., a consistent velocity of an object). However, because the objects of interest in the video frames 103 are texts overlaid on the video frames 103, those rules for physical objects and people do not apply. Text overlaid on the video frames 103 may be animated with a more diverse range of effects, such as fade-in/fade-out, fly-in/fly-out, roll-in/roll-out, zoom-in/zoom-out, flip-in/flip-out, expanding/shrinking, and the like.

Figure 2:
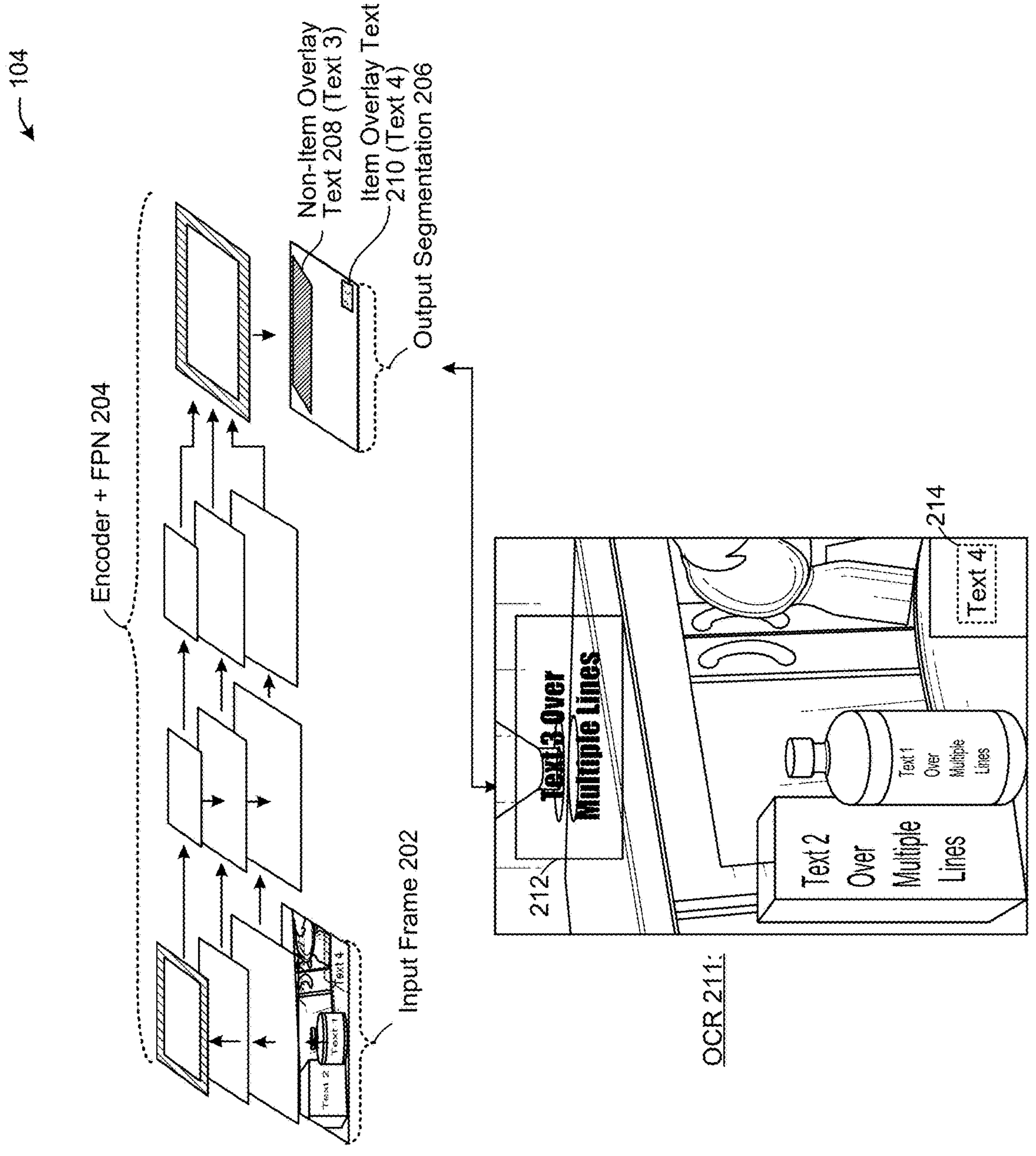
FIG. 2 illustrates the video frame overlay text group detection and character recognition for the process of FIG. 1, in accordance with one or more embodiments of the present disclosure.

FIG. 2 illustrates the video frame overlay text group detection and character recognition 104 for the process 100 of FIG. 1, in accordance with one or more embodiments of the present disclosure.

Referring to FIG. 2, the video frame overlay text group detection and character recognition 104 may include analysis of an input frame 202 (e.g., one of the video frames 103 of FIG. 1) with overlay text (e.g., Text 1, Text 2, Text 3, and Text 4 as shown in FIG. 1). The input frame 202 may be input to an encoder and FPN 204 (e.g., as an example model structure for the video frame overlay text group detection and character recognition 104), which may produce an output segmentation 206 of the input frame 202 in which the text is detected and classified as non-item overlay text (e.g., non-item overlay text 208 representing Text 3) and/or item overlay text (e.g., item overlay text 210, which may be text on a label, sign, package, etc.). Non-overlay text (e.g., scene texts such as Text 1 and Text 2) may be ignored. The video frame overlay text group detection and character recognition 104 may detect the overlay text groups and their respective bounding boxes (e.g., bounding box 212 for Text 3, bounding box 214 for Text 4). The detected text groups and bounding boxes may be scored (e.g., an average of pixel prediction value within a bounding box) and classified.

OCR 211 (e.g., character recognition modules, which may be part of a service whose API may be called for the recognition) or other character recognition may be applied to recognize the characters of the text in the bounding boxes, regardless of their language and without being provided the text language. One technique for the OCR 211 may include calling an API (application programming interface) for a text detection service trained and fine-tuned using different fonts, sizes, styles, languages, and the like for different texts. Calling the OCR 211 service may not include providing the language of the detected text, which may be unknown because it may be overlay text. The OCR 211 may return all identified texts at the line-level. The video frame overlay text group detection and character recognition 104 may perform a one-to-many matching between the text detection results and the results of recognized text from the OCR 211 to identify text lines within a respective bounding box. For a given frame, a text field may be populated with the recognized texts from the OCR 211, which may have a similarity score and a classification. Calling the API for the OCR 211 may occur only for every sampled frame, which may be a subset of the video frames 103 because sampling may occur only every n frames where n<the total number of the video frames 103.

In one or more embodiments, the video frame overlay text group detection and character recognition 104 may be trained. Specifically, the segmentation model of the FPN may be trained using a video data set in multiple languages. Frames of the set may be sampled with a strategy of de-duplicating highly similar images, and the frames used to train the model may have localizable on-screen text. The text detection may be evaluated by comparing the detected text boxes against boxes in ground-truth annotation provided to the model. The training data set also may use a hard pair mining technique because many image pairs in the set may be trivial. Hard positive pairs may be group images during transitions. Hard negative pairs may be group images having the same background color/pattern and same font size/style, but different text content.

Figure 3:
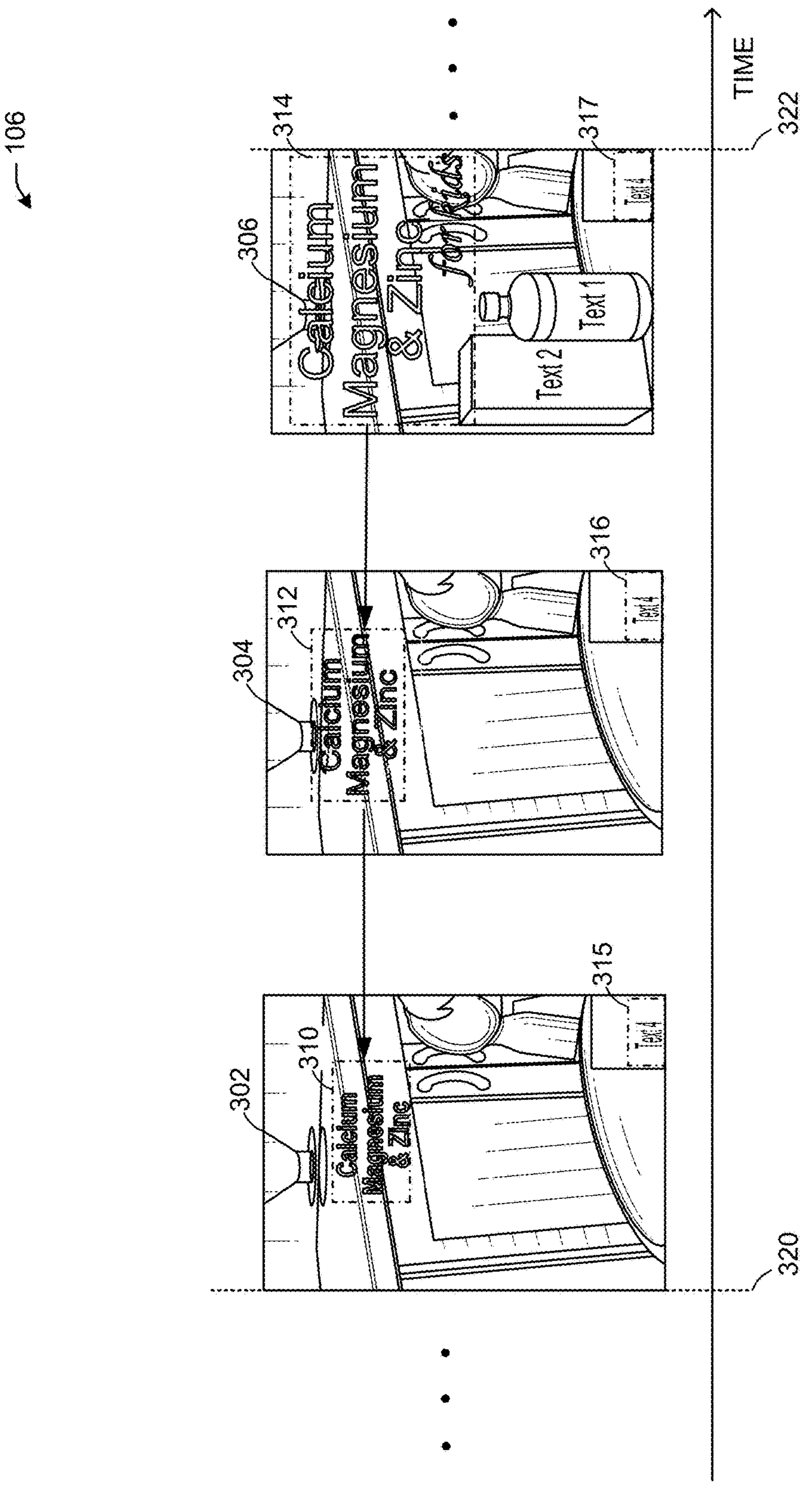
FIG. 3 illustrates the text group tracking for the process of FIG. 1, in accordance with one or more embodiments of the present disclosure.

FIG. 3 illustrates the text group tracking 106 for the process 100 of FIG. 1, in accordance with one or more embodiments of the present disclosure.

Referring to FIG. 3, detected texts in video frames may appear differently in different video frames. As shown, video frames 302, 304, and 306 (e.g., of the video frames 103 of FIG. 1) over time may show texts that may be the same/related. For example, the video frame overlay text group detection and character recognition 104 may identify text in text box 310 of video frame 302, text in text box 312 of video frame 304, and text in text box 314 of video frame 306. The video frame overlay text group detection and character recognition 104 also may identify text in text box 315 of video frame 302, text in text box 316 of video frame 304, and text in text box 317 of video frame 306. The text in any of the text boxes across the frames may have location and/or textual similarity with any of the text in the text boxes across other frames. For example, the text in text box 310 may appear at time 320 (e.g., a timestamp) and may disappear at time 322 (e.g., a timestamp), and may appear in different sizes, styles, locations, etc. across the multiple frames.

In one or more embodiments, the text group tracking 106 may determine text similarity for normalized texts in each detected text group by comparing each text in a detected text box of one frame with each text in a detected text box in each additional frame. For example, the text in the text box 314 in the video frame 306 may be compared to the text in the text box 312 and the text in the text box 316 of video frame 304 for a match, resulting in a best match of text box 314 and text box 312. Then, the text in the text box 312 of the video frame 312 may be compared to the text in the text box 310 of the video frame 302 and text in the text box 315 of video frame 302, resulting in a best match of text box 312 and text box 310. Therefore, the text in the text boxes 310, 312, and 314 may be considered matching across multiple video frames.

In one or more embodiments, the normalizing step may include: (1) lower-casing all the words, (2) removing symbols, (3) removing punctuation, and (4) removing multiple white spaces and leading and trailing white spaces. The text similarity score $S_{text}$ between the j-th detection on frame l, $D_{l,j}$, and the i-th detection on frame k, $D_{k,i}$ may be represented by:

$$S_{text} = (D_{l,j}, D_{k,i}) = \max\left(\mathbb{1}_{c_{k,i} \subseteq c_{l,j} | c_{l,j} \subseteq c_{k,i}} \alpha_1, \mathbb{1}_{CER(c_{k,i}, t_{i,j}) < 0.1} \alpha_2\right),$$

where $t_{k,i}$ denotes the normalized text for detection $D_{k,i}$, $t_{l,j}$ denotes the normalized text for detection $D_{l,j}$, CER( ) denotes character error rate between two strings defined by the sum of substitution, deletion, and insertion errors divided by a number of characters in the reference string, and $\alpha_1$ and $\alpha_2$ are hyper-parameters set at 1 and 0.9, for example.

In one more embodiments, the location similarity score determined by the text group tracking 106 may be based on an intersection over minimum (IoM), which test results have found is an improvement over intersection over union (IoU) due to the prevalent transitional frames where a text track is partially shown in the video frames 103. For two consecutively sampled frames (e.g., not necessarily two actual consecutive frames in the video frames 103) where a text track is partially visible in one sampled frame and fully visible in the next sampled frame, the two detections may have a low IoU score, but a high IoM score.

In one more embodiments, using IoM for the scoring helps associate the text tracks in transition and produces fewer broken text tracks. The location similarity score $S_{loc}$ of the text may be defined as:

$$S_{loc}(D_{l,j}, D_{k,i}) = loM(D_{l,j}, D_{k,i}) = \frac{(\text{Area}(\text{box}_{l,j} \cap \text{box}_{k,i})}{\min(\text{Area}(\text{box}_{l,j})\text{Area}(\text{box}_{k,i}))}.$$

The pairwise matching cost between two detections $L_{match}(D_{l,j}, D_{k,i}) = 1 - w_1 S_{text} - w_2 S_{loc}$, where $w_1$ and $w_2$ are hyper-parameters set to 0.6 and 0.4, for example. An algorithm using the matching cost may associate pairwise detections with a cost limit (e.g., 0.2). Text tracks may be constructed sequentially by pairwise matching the detections on each sampled video frame. However, sequentially processing each video frame to extend a text track may be impacted by false negative detection errors, especially when occlusion or transition causes the texts to be partially or barely visible on certain frames. The broken track problem may be alleviated by including a lost track margin. When there is a frame in which a text detection cannot be matched with an active text track, instead of immediately stopping the extension of the active text track, the text group tracking 106 may keep the track active for a few more additional frames, and may reactivate the track when a detection is found within the subsequent frames. The text group tracking 106 may stop extending a track when an object is lost in a number of frames, where the number of frames may be a hyper-parameter (e.g., lost margin).

In one or more embodiments, a similarity score may be a combination of text similarity score and location similarity score. The text similarity score may measure text similarity of normalized text, using word-level/character-level edit distances or error rates, however, the following heuristic may be used: (a) if two groups have identical text content or one is a subset of another, a score of 1 may be assigned; (b) if two groups have a character error rate of <0.1, a score of 0.9 may be assigned; otherwise (c) assign a text similarity score of 0. The location similarity score may represent an intersection over a smaller text box area. A float may indicate a ratio between intersection of two bounding boxes and a minimum area of the two bounding boxes.

In one or more embodiments, the algorithm used by the text group tracking may be as follows. For a sequence of frame-wise text detection, initialize tracks of the video. For the k-th text detection, perform associations between the k-th text detection and tracks being tracked across multiple frames. Initialize new tracks for lost/remaining tracks without an association. Move unmatched tracks to a set of lost tracks, and process the lost tracks in the set. Table 1 below shows example evaluation reason codes for extracted text groups.

TABLE 1

Evaluation Reason Codes for Extracted Text Groups

| Reason | Description | Acceptable? |
|---|---|---|
| Missing localizable text | An entire localizable text group is missing in the model extracted list of texts | No |
| Significant spelling errors | Misspelling(s) that made the text group unreadable or affected ability understand the meaning of the text group | No |
| Significant timing errors | Error in start/end time >1.5 seconds that negatively impacts user experience of viewing text | No |
| Missing words or incomplete text group | If the text group was partially extracted and missing entire words important to the context | No |
| Irrelevant/ redundant information | Duplicate, repetitive text with content already covered by other text groups on screen | No |
| Non-overlay text | Text in the background or on item packaging, etc. that is not relevant to the narrative of the video | No |
| Contains extra words | Extracted text group contains extra words that are background or non-overlay scene texts | No |
| Minor spelling errors | Minor misspellings that do not affect readability of the segment | Yes |
| Minor timing errors | Error in start/end time less than or equal to 1.5 seconds | Yes |
| Matched | Correct extraction, no issue | Yes |

Based on the criteria of Table 1, a group-level acceptance rate may be calculated:

$$\text{Group-level Acceptance Rate} = \frac{\text{number of acceptable text group extraction}}{\text{number of all extracted groups} + \text{number of missed localizable text groups}}$$

The group-level acceptance rate may be used to compare the extracted text groups to human-annotated texts to evaluate whether the extracted text groups are acceptable. The enhancements of the process 100 improve the acceptance rate compared to other existing techniques.

In one or more embodiments, an example track may include a starting_frame_id (e.g., identifier of the frame in which the text first appears), an end_frame_id (e.g., identifier of the frame in which the text last appears before disappearing), track_length, and detections (e.g., a list of detected objects and their corresponding detection information, such as bounding box, classification, the detected text, etc.

Figure 4:
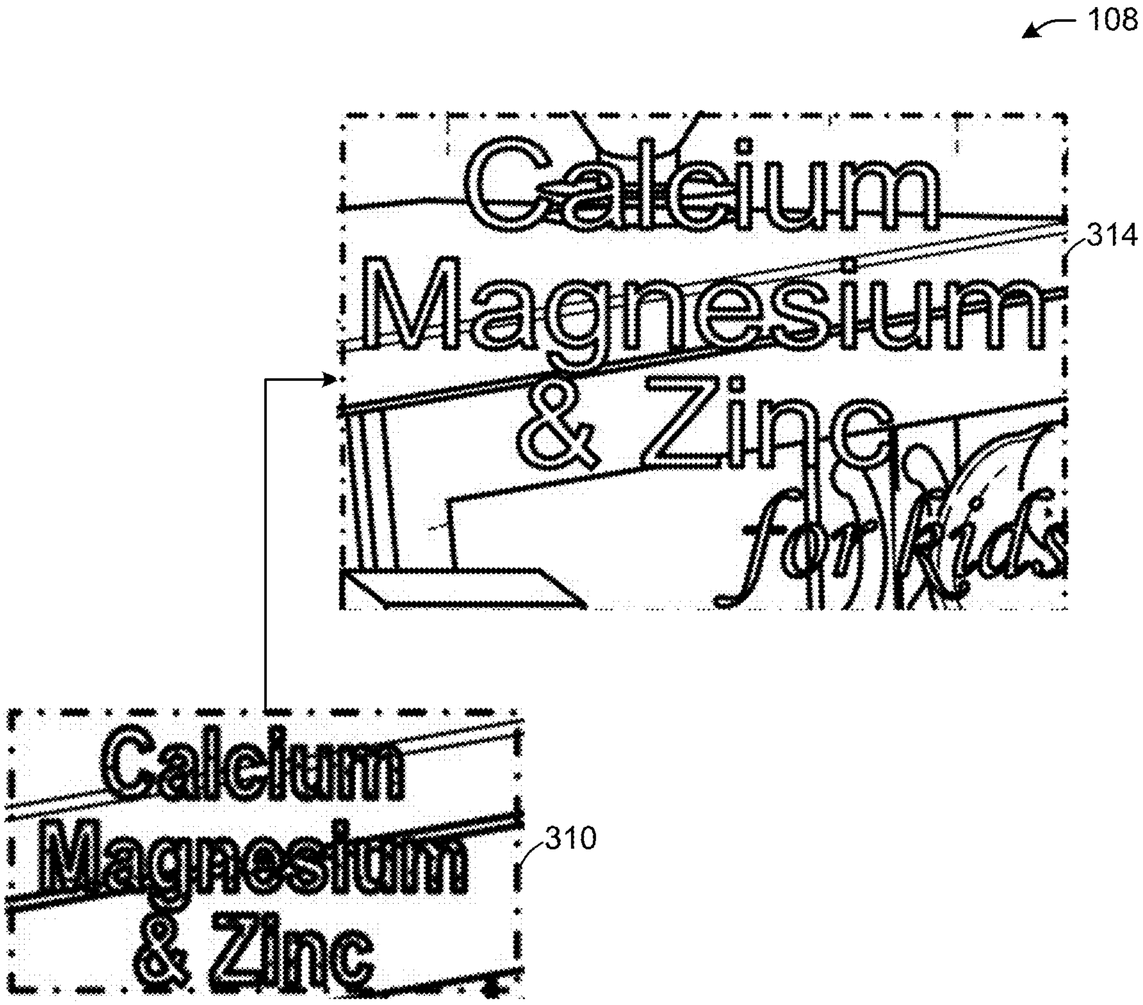
FIG. 4 illustrates the post-processing for the process of FIG. 1, in accordance with one or more embodiments of the present disclosure.

FIG. 4 illustrates the post-processing 108 for the process 100 of FIG. 1, in accordance with one or more embodiments of the present disclosure.

Referring to FIG. 4, the post-processing 108 may include an enhancement in which a text track is broken (e.g., partially occluded), so a short version of the text track (e.g., text box 310 of FIG. 3) may be merged with an adjacent long text track (e.g., the text box 314).

Because of the motion and transition of texts across multiple frames (e.g., as shown in FIG. 3), tracking may be challenging. False negative errors may occur when texts are partially occluded, causing broken text tracks. The OCR 211 of FIG. 2 also may generate noisy recognized texts during transitional frames (e.g., as the text begins to appear in a frame, but is not yet fully displayed). Because the tracking at FIG. 3 associates directions using the text similarity score, the OCR 211 noise also may result in broken text tracks. The post-processing 108 alleviates the tracking and recognition errors.

In one or more embodiments, the post-processing 108 may include the following steps: merging short tracks, merging similar tracks, removing very short/unstable tracks, and extracting/removing certain texts (e.g., text representing item names, entity names, etc.). For merging the short tracks, given the prevalence of extremely short text tracks as a result of noisy detection/recognition at transition frames, the short tracks may be compared to adjacent text tracks that share temporal and spatial proximity, and may be merged with the longer tracks when substantial similarity is identified. The merging criteria is based on bounding box overlap, time similarity, and image similarity. The image similarity may be determined through embeddings generated from an image similarity model (e.g., trained with a Siamese network framework).

For merging similar tracks, when fast transition happens, a text track can be broken due to the positional dissimilarity of the two group images on adjacent frames, because tracking is based on both position similarity and text similarity. The text tracks may be compared globally and pairwise, and merged if they meet thresholds for track similarity based on time/bounding box proximity, and text similarity.

After merging short and similar tracks, extremely short text tracks with low detection confidence levels may be removed. Unstable tracks may be removed if they are text unstable (e.g., each detection of the track has a different OCR result) and/or bounding box unstable (e.g., the center position of the bounding box and area of the bounding box within the track have a variance above a variance threshold).

In one or more embodiments, after the post-processing 108, the timed texts 110 as outputs of the process 100 may include identified grouped texts, their start time, their end time, the polygon defining the pixel locations of their bounding box, and the detected text within the bounding box.

Figure 5:
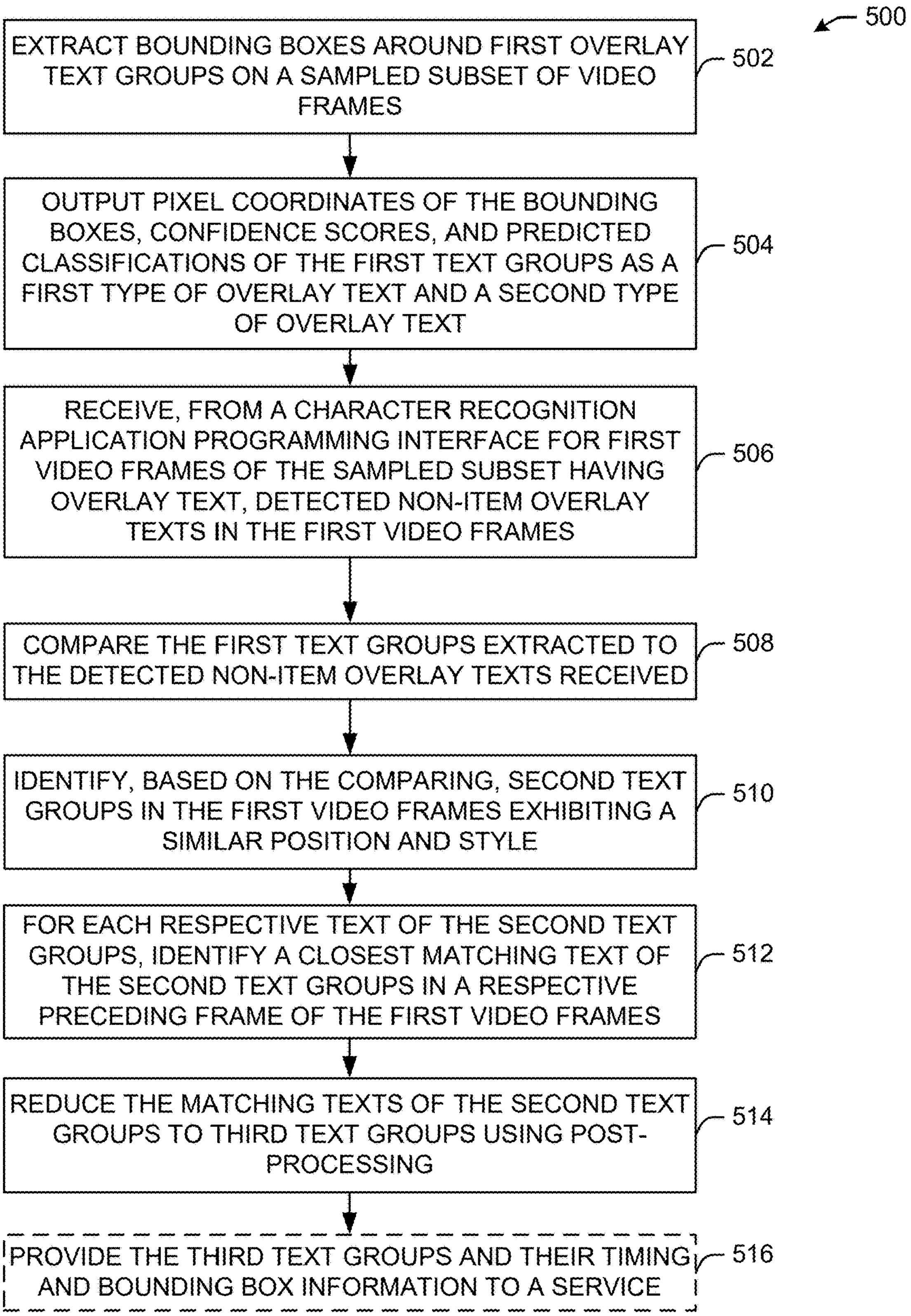
FIG. 5 is a flow for an example process for enhanced multilingual video on-screen text extraction, in accordance with one or more embodiments of the present disclosure.

FIG. 5 is a flow for an example process 500 for enhanced multilingual video on-screen text extraction, in accordance with one or more embodiments of the present disclosure.

At block 502, a device (or system, e.g., the components of FIG. 1, the video text extraction modules 619 of FIG. 6) may extract bounding boxes around first text groups of clusters of related words sharing visual features in a sampled subset of video frames. The extraction may be performed by a machine learning semantic segmentation model, which may classify each pixel in a given video frame into three classes—item overlay text, non-item overlay text, and background. With the pixel-wise segmentation, the model may then extract bounding boxes around each detected and located text object.

At block 504, the device may output, using the model, pixel coordinates of the bounding boxes, confidence scores representing an average of pixel-level classification predictions within the bounding boxes, and predicted classifications of the first text groups as overlay text and non-overlay text. The segmentation machine learning architecture may be based on multi-scale features extracted from the video frames at different resolutions. In contrast with existing text detection techniques where text is detected at a word level or line level, the enhanced text detection herein detects groups of text, where a text group is a cluster of words with self-contained meaning. Text detection at a group level may be facilitated by words in a text group being physically close to each other and being visually similar (e.g., font and size). The detection results may include bounding box coordinates, a confidence score (e.g., an average of the pixel-level prediction values within the bounding box), and a predicted class of the text group.

At block 506, the device may call a character recognition API for analysis of first video frames of the sampled subset based on the first video frames being identified as including non-item overlay text. The call may not specify the language of the text, but the character recognition may detect non-item overlay texts in the first video frames in any language without being provided the text language.

At block 508, the device may compare the first text groups extracted by the model to the received detected non-item overlay texts from the character recognition. At block 510, based on the comparing, the device may identify second text groups in the first video frames. Respective text groups of the second text groups should have a similar position (e.g., in the frames) and text style, forming text tracks to be tracked across multiple frames to identify when the tracks are present and not present in the frames.

At block 512, the device may determine, for any respective text of the second text groups in a respective frame, a respective additional text of the second text groups in a respective preceding frame that is most closely associated with (e.g., matched with) the respective text of the respective frame. In this manner, for each text in each frame, the text may be compared to the texts a preceding frame to determine whether the text in one frame is related to the text in another frame. When a match is found in a preceding frame, then the text on that preceding frame may be evaluated for a match in a preceding frame (e.g., working backward). When no match is found on a preceding frame (e.g., no match for overlay text in frame t found in frame t−1), the device may continue working backward until either a match is found or a threshold number of frames have been evaluated without identifying a match (e.g., frame t−5). The association may include normalizing the respective texts of the second text groups, determining text similarities of the normalized respective texts of the second text groups, and determining location similarities, using an intersection over minimum (IoM) technique, of the normalized respective texts of the second text groups to determine whether a text track is present in multiple frames, even when the text track does not appear in the same style and location on every frame. In particular, each of the texts identified in a given frame may be compared to each of the texts identified in the preceding frame(s) to determine which, if any, of the texts in the preceding frame(s) is most closely associated.

At block 514, the device may perform post-processing to reduce the matching texts of the second text groups to third text groups by merging similar and short tracks, and by removing very short tracks (e.g., using similarity and length thresholds). At block 516, optionally, the device may provide the third text groups along with their start times, end times, bounding box locations, and texts, to a service (e.g., a translation service or another type of service).

The examples herein are not meant to be limiting.

Figure 6:
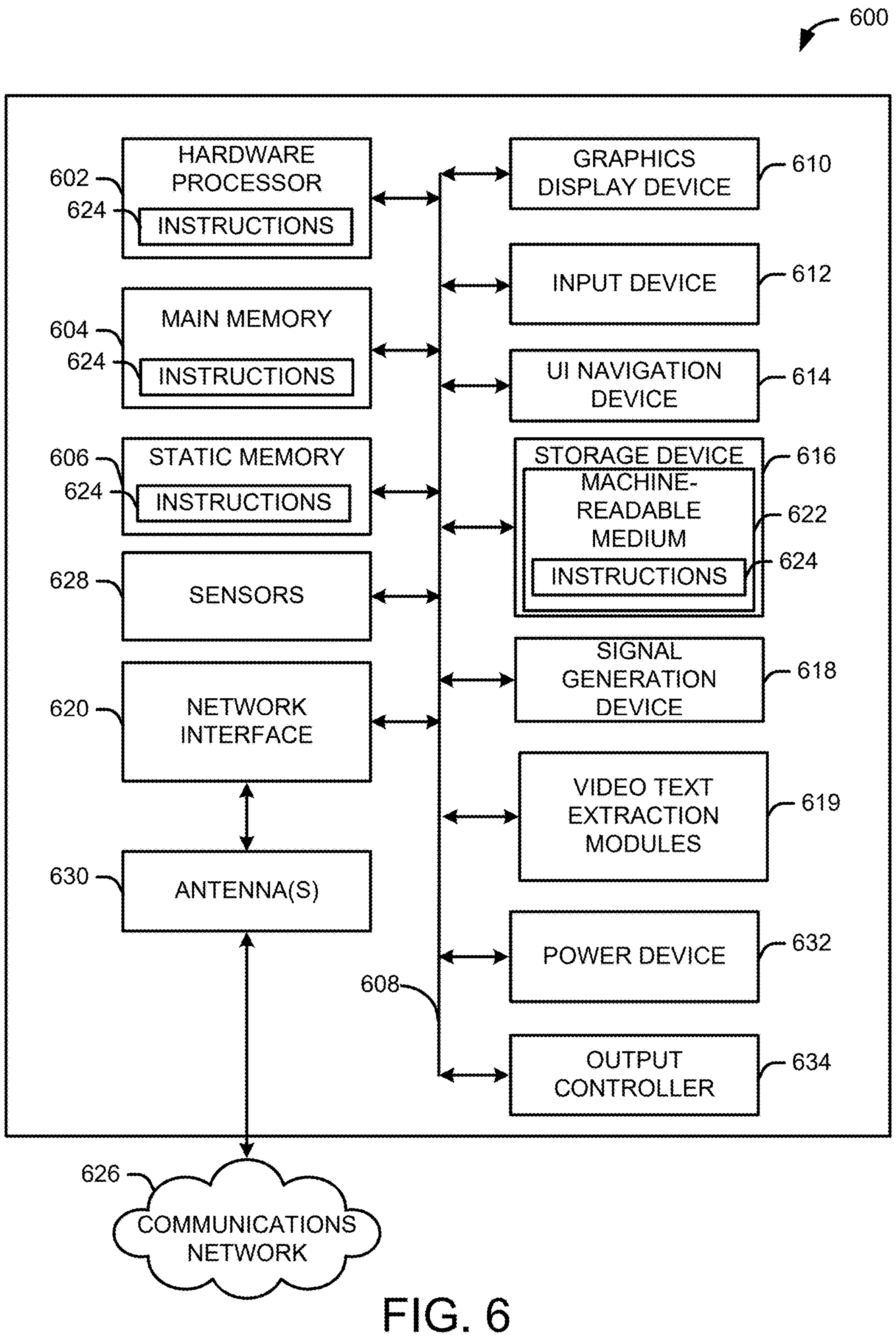
FIG. 6 illustrates a block diagram of an example machine upon which any of one or more techniques (e.g., methods) may be performed, in accordance with one or more example embodiments of the present disclosure.

FIG. 6 illustrates a block diagram of an example machine upon which any of one or more techniques (e.g., methods) may be performed, in accordance with one or more example embodiments of the present disclosure.

In other embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a server, a personal computer (PC), a smart home device, a tablet PC, a personal digital assistant (PDA), a mobile telephone, a wearable computer device, a web appliance, a network device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 600 (e.g., computer system) may include a hardware processor 602 (e.g., a central processing unit (CPU), a graphics processing unit (GPU), a hardware processor core, or any combination thereof), a tensor processing unit (TPU), a main memory 604 and a static memory 606, some or all of which may communicate with each other via an interlink (e.g., bus 608). The machine 600 may further include a power device 634, a graphics display device 610, an input device 612 (e.g., a keyboard), and a user interface UI navigation device 614 (e.g., a mouse). In an example, the graphics display device 610, input device 612, and UI navigation device 614 may be a touch screen display. The machine 600 may additionally include a storage device 616, a signal generation device 618, one or more video text extraction modules 619 (e.g., representing any of the components FIG. 1 and capable of performing the process 100 of FIG. 1 and/or the process 500 of FIG. 5), a network interface 622 coupled to antenna(s) 632, and one or more sensors 628. The machine 600 may include an output controller 636, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine-readable medium 624 on which is stored one or more sets of data structures or instructions 626 (e.g., software) embodying or utilized by any one or more of the techniques or functions described herein. The instructions 626 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 624 is illustrated as a single medium, the term "machine-readable medium" may include a single medium or multiple media (e.g., a centralized or distributed database, and/or associated caches and servers) configured to store the one or more instructions 626.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 626 may further be transmitted or received over a communications network 630 using a transmission medium via the network interface 622 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 622 may include one or more physical jacks (e.g., Ethernet, coaxial, or phone jacks) or one or more antennas to connect to the communications network 630. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for multilingual video on-screen text extraction, the method comprising:

extracting, by a language-independent semantic segmentation model with a feature pyramid network architecture and an encoder, bounding boxes around first overlay text groups of clusters of related words sharing visual features in a sampled subset of video frames;

outputting, by the language-independent semantic segmentation model, pixel coordinates of the bounding boxes, confidence scores representing an average of pixel-level classification predictions within the bounding boxes, and predicted classifications of the first overlay text groups as item overlay text and non-item overlay text;

receiving, by at least one processor, from an optical character recognition (OCR) application programming interface (API) for first video frames, of the sampled subset of video frames, detected non-item overlay texts in the first video frames at a text group-level;

comparing, by the at least one processor, the first overlay text groups extracted by the language-independent semantic segmentation model to the detected non-item overlay texts received from the OCR API;

identifying, by the at least one processor, based on the comparing, second overlay text groups in the first video frames, wherein respective text groups of the second overlay text groups exhibit a similar position and style;

identifying, by the at least one processor, for a respective text of the second text groups, in a respective video frame, a closest matching text in a video frame preceding the respective video frame of the first video frames;

identifying, by the at least one processor, for the second text groups, based on the closest matching text, a respective start time in which a respective text of the second text groups first appears in the first video frames;

identifying, by the at least one processor, for the second text groups, based on the closest matching text, a respective end time in which the respective text of the second text groups disappears from the first video frames;

outputting, by the at least one processor, for the second text groups, starting video frame identifiers corresponding to the respective start times, end video frame identifiers corresponding to the respective end times, lengths, detected texts within corresponding bounding boxes, and classifications; and reducing, by the at least one processor, the second text groups to third text groups based on the lengths, similarities of respective texts of the second text groups, and results of the OCR API.

2. The method of claim 1, further comprising:

detecting, using the language-independent semantic segmentation model, the first text groups based on proximity of characters of the first text groups to each other and based on the visual features, wherein the visual features comprise font size and style.

3. The method of claim 1, further comprising:

normalizing the respective texts of the second text groups;

determining text similarities of the normalized respective texts of the second text groups; and determining location similarities, using an intersection over minimum (IoM) technique, of the normalized respective texts of the second text groups, wherein identifying the closest matching text is based on the text similarities and the location similarities.

4. The method of claim 1, further comprising:

merging first texts of the second text groups based on first lengths of the first texts being below a first threshold length;

merging second texts of the second text groups based on similarities between respective texts of the second texts being above a similarity threshold; and removing third texts of the second text groups based on second lengths of the third texts being below a second threshold length and based on detection confidence levels of the third texts being below a confidence threshold, wherein reducing the second text groups to the third text groups is based on the merging of the first texts, the merging of the second texts, and the removing of the third texts.

5. A method for multilingual video on-screen text extraction, the method comprising:

extracting, by a language-independent machine learning semantic segmentation model, bounding boxes around first text groups of clusters of related words sharing visual features in a sampled subset of video frames;

outputting, by the machine learning semantic segmentation model, pixel coordinates of the bounding boxes and predicted classifications of the first text groups as a first type of overlay text and a second type of overlay text;

receiving, by at least one processor, from a character recognition application programming interface (API), detected non-item overlay texts in the sampled subset of video frames at a line-level;

identifying, by the at least one processor, based on the detected non-item overlay texts received from the character recognition API, second text groups in the sampled subset of video frames, wherein respective text groups of the second text groups exhibit a similar position and style;

identifying, by the at least one processor, for the second text groups, a respective start time in which a respective text of the second text groups first appears in the sampled subset of video frames;

identifying, by the at least one processor, for the second text groups, a respective end time in which a respective text of the second text groups disappears from the sampled subset of video frames; and reducing, by the at least one processor, the second text groups to third text groups based on the respective start times, the respective end times, and similarities of respective texts of the second text groups.

6. The method of claim 5, further comprising:

detecting, using the language-independent machine learning semantic segmentation model, the first text groups based on proximity of characters of the first text groups to each other and based on the visual features, wherein the visual features comprise font size and style.

7. The method of claim 5, further comprising:

normalizing the respective texts of the second text groups;

determining text similarities of the normalized respective texts of the second text groups;

determining location similarities, using an intersection over minimum (IoM) technique, of the normalized respective texts of the second text groups; and identifying, for a respective text of the second text groups, in a respective video frame, a closest matching text in a video frame preceding the respective video frame, wherein identifying the closest matching text is based on the text similarities and the location similarities.

8. The method of claim 7, further comprising:

assigning a first text similarity score to two first normalized respective texts of the second text groups when the two first normalized respective texts comprise identical text content;

assigning a second text similarity score to two second normalized respective texts of the second text groups when the two second normalized respective texts exhibit an error rate of less than a threshold error rate; and assigning a third text similarity score to two third normalized respective texts of the second text groups when the two third normalized respective texts exhibit an error rate greater than or equal to the threshold error rate, wherein determining the text similarities is based on the first text similarity score, the second text similarity score, and the third text similarity score.

9. The method of claim 7, further comprising:

generating, based on the text similarities and the location similarities, text tracks for identifying the closest matching text, wherein identifying the closest matching text is based on comparing the text tracks across the sampled subset of video frames.

10. The method of claim 9, further comprising:

determining that a text track of the text tracks does not match a first text track of a first video frame of the sampled subset of video frames;

comparing the text track to a second text track of a second video frame of the second video frames, wherein the second video frame is after the first video frame; and reactivating the text track based on a match between the text track and the second text track.

11. The method of claim 5, further comprising:

merging first texts of the second text groups based on first lengths of the first texts being below a first threshold length;

merging second texts of the second text groups based on similarities between respective texts of the second texts being above a similarity threshold; and removing third texts of the second text groups based on second lengths of the third texts being below a second threshold length and based on detection confidence levels of the third texts being below a confidence threshold, wherein reducing the second text groups to the third text groups is based on the merging of the first texts, the merging of the second texts, and the removing of the third texts.

12. The method of claim 5, further comprising:

calling the character recognition API for a subset of the sampled video frames on which overlay text is identified by the machine learning semantic segmentation model, wherein the detected non-item overlay texts received from the character recognition API are detected on the subset of the sampled video frames.

13. The method of claim 5, further comprising:

comparing the first text groups extracted by the semantic segmentation model to the detected non-item overlay texts received from the character recognition API, wherein identifying the second text groups is based on the comparing.

14. The method of claim 5, further comprising:

identifying, for a respective text of the second text groups, in a respective video frame, a closest matching text in a video frame preceding the respective video frame, wherein identifying the respective start time and the respective end time are based on identifying the closest matching text.

15. The method of claim 5, further comprising:

providing, to a translation service, the third text groups, respective start times of the third text groups, respective end times of the third text groups, bounding box locations of the third text groups in the sampled subset of video frames, and the respective texts of the third text groups.

16. A system for multilingual video on-screen text extraction, the system comprising:

a language-independent machine learning semantic segmentation model; and memory coupled to at least one processor, wherein the at least one processor is configured to:

extract, using the language-independent machine learning semantic segmentation model, bounding boxes around first text groups of clusters of related words sharing visual features in a sampled subset of video frames;

output, using the language-independent machine learning semantic segmentation model, pixel coordinates of the bounding boxes and predicted classifications of the first text groups as a first type of overlay text and a second type of overlay text;

receive, from a character recognition application programming interface (API), detected non-item overlay texts in the sampled subset of video frames at a line-level;

identify, based on the detected non-item overlay texts received from the character recognition API, second text groups in the sampled subset of video frames, wherein respective text groups of the second text groups exhibit a similar position and style;

identify, for the second text groups, a respective start time in which a respective text of the second text groups first appears in the sampled subset of video frames;

identify, for the second text groups, a respective end time in which a respective text of the second text groups disappears from the sampled subset of video frames; and reduce the second text groups to third text groups based on the respective start times, the respective end times, and similarities of respective texts of the second text groups.

17. The system of claim 16, wherein the at least one processor is further configured to:

detect, using the language-independent machine learning semantic segmentation model, the first text groups based on proximity of characters of the first text groups to each other and based on the visual features, wherein the visual features comprise font size and style.

18. The system of claim 17, wherein the at least one processor is further configured to:

normalize the respective texts of the second text groups;

determine text similarities of the normalized respective texts of the second text groups;

determine location similarities, using an intersection over minimum (IoM) technique, of the normalized respective texts of the second text groups; and identify, for a respective text of the second text groups, in a respective video frame, a closest matching text in a video frame preceding the respective video frame, wherein to identify the closest matching text is based on the text similarities and the location similarities.

19. The system of claim 18, wherein the at least one processor is further configured to:

assign a first text similarity score to two first normalized respective texts of the second text groups when the two first normalized respective texts comprise identical text content;

assign a second text similarity score to two second normalized respective texts of the second text groups when the two second normalized respective texts exhibit an error rate of less than a threshold error rate; and assign a third text similarity score to two third normalized respective texts of the second text groups when the two third normalized respective texts exhibit an error rate greater than or equal to the threshold error rate, wherein to determine the text similarities is based on the first text similarity score, the second text similarity score, and the third text similarity score.

20. The system of claim 18, wherein the at least one processor is further configured to:

generate, based on the text similarities and the location similarities, text tracks for identifying the closest matching text, wherein to identify the closest matching text is based on comparing the text tracks across the sampled subset of video frames.

* * * * *